United States Patent
Rajwan et al.

(10) Patent No.: US 12,197,268 B2
(45) Date of Patent: Jan. 14, 2025

(54) REQUEST AND FLOOR INTERFACE FOR CURRENT CONTROL WITH CORRECTNESS IN AN SOC

(71) Applicant: Apple Inc., Cupertino, CA (US)

(72) Inventors: Doron Rajwan, Rishon LeZion (IL); Inder M. Sodhi, Palo Alto, CA (US); Keith Cox, Sunnyvale, CA (US); Jung Wook Cho, Cupertino, CA (US); Kevin I. Park, San Francisco, CA (US); Tal Kuzi, Tel Aviv (IL)

(73) Assignee: Apple Inc., Cupertino, CA (US)

( * ) Notice: Subject to any disclaimer, the term of this patent is extended or adjusted under 35 U.S.C. 154(b) by 54 days.

(21) Appl. No.: 17/573,274

(22) Filed: Jan. 11, 2022

(65) Prior Publication Data

US 2023/0109984 A1    Apr. 13, 2023

Related U.S. Application Data

(60) Provisional application No. 63/247,854, filed on Sep. 24, 2021.

(51) Int. Cl.
*G06F 1/3234* (2019.01)
*G06F 1/3206* (2019.01)

(52) U.S. Cl.
CPC .......... *G06F 1/3253* (2013.01); *G06F 1/3206* (2013.01)

(58) Field of Classification Search
CPC ...... G06F 1/3296; G06F 1/324; G06F 1/3243; G06F 1/3287; G06F 1/3293; Y02D 10/00
See application file for complete search history.

(56) References Cited

U.S. PATENT DOCUMENTS

| | | |
|---|---|---|
| 6,686,831 B2 | 2/2004 | Cook et al. |
| 8,509,974 B2 | 8/2013 | Sujan et al. |
| 8,788,777 B2 | 7/2014 | Zaarur et al. |
| 9,477,279 B1 | 10/2016 | Piszczek et al. |
| 10,231,314 B2 | 3/2019 | Wendt et al. |
| 2004/0021371 A1 | 2/2004 | Jouper |
| 2004/0215982 A1 | 10/2004 | Subramanian et al. |
| 2012/0005514 A1 | 1/2012 | Henry et al. |
| 2012/0185706 A1 | 7/2012 | Sistla et al. |
| 2013/0061064 A1 | 3/2013 | Ananthakrishnan et al. |

(Continued)

FOREIGN PATENT DOCUMENTS

KR    10-2016-0136410 A    11/2016

OTHER PUBLICATIONS

Office Action in U.S. Appl. No. 17/573,268 mailed Aug. 4, 2023, 10 pages.

(Continued)

*Primary Examiner* — Phil K Nguyen
*Assistant Examiner* — Brian J Corcoran
(74) *Attorney, Agent, or Firm* — Kowert, Hood, Munyon, Rankin & Goetzel, P.C.

(57) ABSTRACT

In an embodiment, a system may include a plurality of component circuits. The plurality of component circuits may include rate control circuits the control power consumption in the component circuits based on indications of power allocated to the component circuits. In an embodiment, the rate control circuits may transmit power requests for the component circuits and a floor request representing a minimum amount of power that may ensure reliable operation.

18 Claims, 11 Drawing Sheets

(56) References Cited

U.S. PATENT DOCUMENTS

| | | |
|---|---|---|
| 2014/0089688 A1 | 3/2014 | Man et al. |
| 2014/0310537 A1 | 10/2014 | Messick et al. |
| 2014/0327310 A1 | 11/2014 | Hsieh et al. |
| 2016/0018883 A1 | 1/2016 | Varma et al. |
| 2016/0054776 A1* | 2/2016 | Lu .............................. G06F 1/10 713/322 |

OTHER PUBLICATIONS

U.S. Appl. No. 17/573,268, filed Jan. 11, 2022.
International Search Report and Written Opinion in PCT Appl. No. PCT/US2022/042532 mailed Dec. 12, 2022, 11 pages.
Office Action in U.S. Appl. No. 17/573,268 mailed Jan. 5, 2024, 12 pages.

* cited by examiner

REQUEST AND FLOOR INTERFACE FOR CURRENT CONTROL WITH CORRECTNESS IN AN SOC

This application claims benefit of priority to U.S. Provisional Patent Application Ser. No. 63/247,854, filed on Sep. 24, 2021. The above application is incorporated herein by reference in its entirety. To the extent that any incorporate material conflicts with material expressly set forth herein, the expressly set forth material controls.

BACKGROUND

Technical Field

Embodiments described herein are related to power control in digital systems and, more particularly, a hardware-based mechanism for global power control.

Description of the Related Art

As digital systems continue to increase in complexity and performance, the complexity to deliver power stably and reliably to the component circuits of the system also increases. In modem systems, an integrated circuit containing processors and other component circuits on a single semiconductor substrate, or chip, can draw hundreds of amps of current at supply voltages in the ~1-2 volt range. Such integrated circuits (e.g., systems on a chip or SOCs) also often have multiple independent voltage domains within the integrated circuit, which can concurrently have different supply voltages and can be presenting different loads (e.g., current drawn at the given load).

BRIEF DESCRIPTION OF THE DRAWINGS

The following detailed description refers to the accompanying drawings, which are now briefly described.

Figure 1:
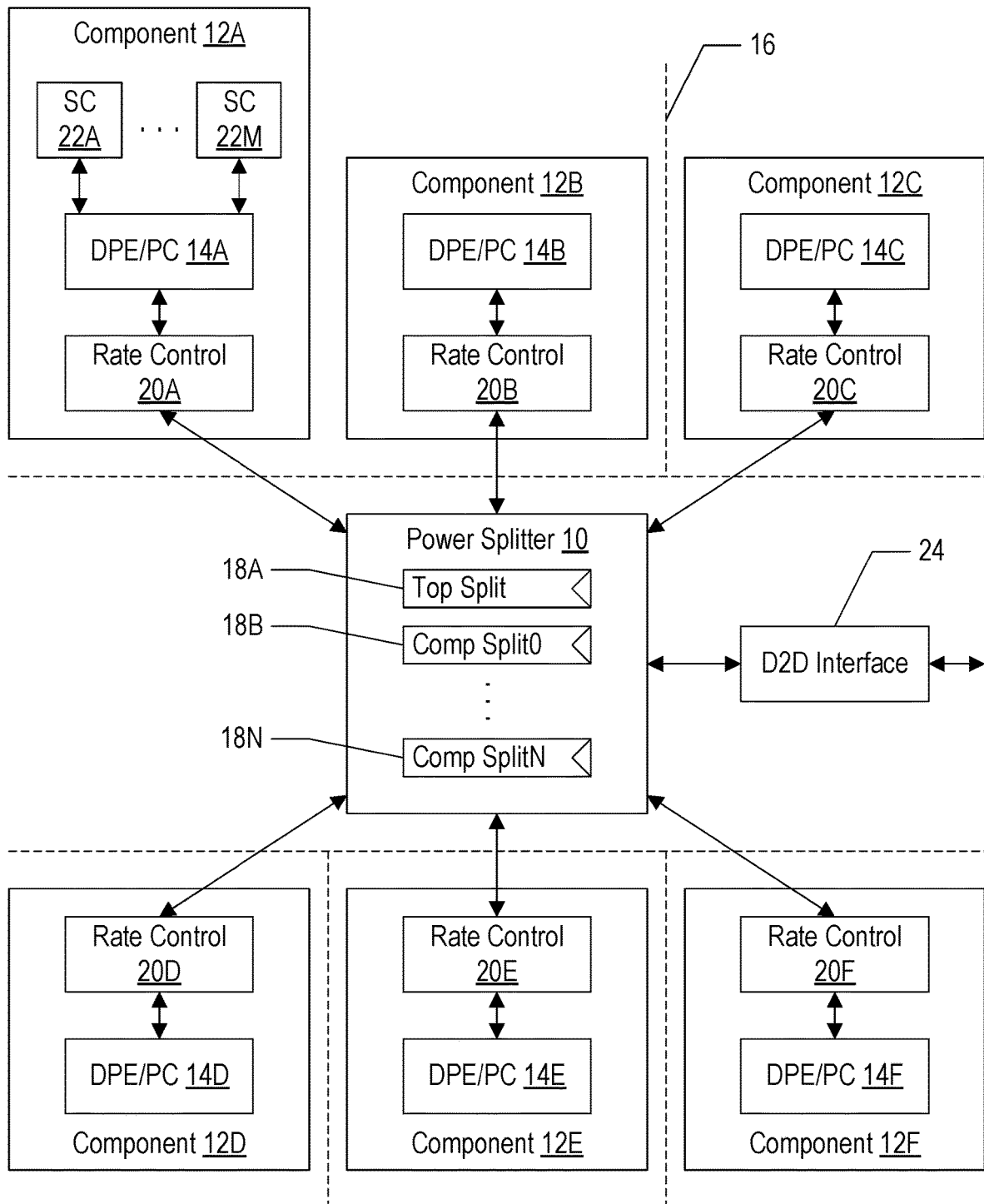
FIG. 1 is a block diagram of one embodiment of a system including a power splitter circuit and rate control circuits for various component circuits in the system.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

In some cases, a multi-level power delivery network is provided. The first level of voltage regulator(s) may supply a first amount of load current to the second level of voltage regulators. The second level of voltage regulators may deliver power to the various independent power networks in the SOC. Various consumers (e.g., processors forming the central processing unit (CPU) of the SOC, graphics processing units (GPUs), various peripheral component circuits ("peripherals"), etc.) may be located in the independent power domains. Local power estimation and power control within the power domains may be used to avoid overloading a given second level voltage regulator. However, providing a first level regulator that can supply the second level regulators when they are concurrently at their peak loads would not be cost effective, since such loads will likely be rare. Thus, another power management mechanism may be implemented to product the first level voltage regulator.

In an embodiment, a system includes a power splitter circuit that is configured to split a power budget for the system among a plurality of component circuits. The power splitter circuit may be programmable with a power split policy, and may divide the power budget based on the policy. The power splitter circuit may be configured to transmit respective indications of the allocated power to the component circuits. The component circuits may include rate control circuits that manage power consumption based on the indications of allocated power. Various component circuits may be included in different independent power domains, but overall power consumption may be controlled via the power splitter circuit. The power budget may be determined based on the capabilities of a top level voltage controller that supplies power to the voltage controllers supplying power to the independent power domains, for example, and may aid in protecting the top level voltage controller from overload.

In an embodiment, the component circuits may include power estimator circuits (e.g., digital power estimator (DPE) circuits). The DPE circuits may be configured to estimate power consumed in the respective component circuits, and may be configured to provide the power estimate to the corresponding rate control circuits. The rate control circuits may be configured to convey respective power requests to the power splitter circuit based on the power estimates. Additionally, in an embodiment, the rate control circuits may be configured to convey respective floor requests. The floor requests may represent a minimum power that will ensure correct operation of the component circuits. For example, the minimum power may be sufficient to supply a maximum amount of power that a given component circuit could consume if even all the power consumption controls in the given component circuit are active (or "engaged"). In one implementation, the floor request may account for leakage current in a given component circuit and operation that may occur in the given component circuit even if reduced power consumption has been activated (e.g., minimum forward progress that the given component circuit may make in the presence of reduced power consumption controls). In an embodiment, the rate control circuit in the given component circuit may have multiple levels of power reduction requests to control the power consumed in the given component circuit, and the floor request may be based on the maximum requested reduction. Viewed in another way, the given component circuit may implement one or more power reduction mechanisms, and the floor may be based on the power that may be consumed when each of the power reduction mechanisms is concurrently engaged. It is possible, in some embodiments, that a component circuit will consume less than the floor request (e.g., if the task(s) being performed by the component circuit require less activity than the minimum forward progress provides). The power splitter circuit may ensure that each component circuit receives a power allocation at least equal to a minimum of its floor request and its power request, and may divide the remaining power among the component circuits based on the power requests and the power policy.

The component circuits may comprise any hardware components that may be included in a system. A given component circuit may include a power control circuit that implements one or more power management mechanisms within the component circuit as a whole. That is, a component circuit may be an entity that is power managed as a unit by a power control circuit. For example, a central processing unit (CPU) processor cluster may be a component circuit. The CPU processor cluster may include one or more processors, and interface circuitry to interface to the rest of the system (e.g., via a system communication fabric). The CPU processor cluster may further include one or more caches in a cache hierarchy shared by the processors (in addition to caches implemented with the processors). Alternatively, the individual CPU processors may be component circuits. Other examples of component circuits may include graphics processing units (GPUs) or memory controllers. Peripheral component circuits (or more briefly, peripherals) such as display controllers, image signal processors, audio processors, video or audio encoder/decoder circuits, bridges to external interconnects of various types, input/output devices, etc. may be examples of component circuits as well.

FIG. 1 is a block diagram of one embodiment of a system. In the embodiment of FIG. 1, the system comprises a plurality of component circuits 12A-12F coupled to a power splitter circuit 10. The plurality of component circuits 12A-12F comprise respective rate control circuits 20A-20F. Additionally, in the illustrated embodiment, the plurality of component circuits include respective digital power estimator (DPE)/power control (PC) circuits 14A-14F, coupled to the respective rate control circuits 20A-20F. The power splitter circuit 10 includes a plurality of power policy registers 18A-18N. The system may further include a die to die (D2D) interface circuit 24 coupled to the power splitter circuit 10.

A given component circuit of the plurality of component circuits 12A-12F is included in one of a plurality of independent power domains, demarcated by the dotted lines 16 shown in FIG. 1. A given component circuit 12A-12F may be in one power domain, and more than one component circuit 12A-12F may be in a given power domain. In the illustrated embodiment, merely as an example, the component circuits 12A-12B are in a power domain, the component circuit 12C is in another power domain, and the component circuits 12D-12F are in respective power domains. The power splitter circuit is also in a power domain, which may be shared with one or more component circuits 12A-12F or may be separate.

A power domain may be independent if it is controlled separately from the other power domains. For example, the independent power domain may have dedicated voltage inputs to the system, which may be controlled, e.g., by a separate voltage controller. Thus, power management within the power domain may be sufficient to protect the stability of the voltage controller supplying power to the domain. However, system-wide power management may be used to manage power across the power domains, and thus may protect higher-level voltage controllers in the system.

The power splitter circuit 10 may be configured to allocate power to the plurality of component circuits 12A-12F from a power budget for the system, as mentioned previously. The power budget may be based on the capability of the voltage controller that supplies power to the system as a whole (e.g., the top level voltage controller that supplies the voltage controllers, which in turn supply the various power domains). For example, the available power (e.g., the maximum current that the top level voltage controller may reliably supply multiplied by the voltage that the top level voltage controller nominally provides) may be represented as a plurality of credits, where a given credit represents a specified amount of power. The power splitter circuit 10 may be configured to provide a respective number of credits to each of the plurality of component circuits 12A-12F to indicate the amount of power allocated to that component circuit. By measuring credits in terms of power (e.g., watts), the power splitter circuit 10 may provide indications of the allocated amounts in a common format that translates across different power domains, which may be operating at different voltages at a given point in time. The power splitter circuit 10 may be configured to communicate respective indications of the allocated power to the respective rate control circuits 20A-20F. The respective rate control circuits 20A-20F may be configured to manage power consumption in the corresponding component circuits based on the respective indication of the allocated power provided to the respective rate control circuits 20A-20F.

More particularly, the component circuits 12A-12F may include respective power control circuits (e.g., the PCs shown in FIG. 1, part of reference numerals 14A-14F). Generally, a power control circuit may implement one or more power management mechanisms, each of which is designed to reduce power consumption in the component circuit 12A-12F when the mechanism is engaged, compared to when it is not engaged. For example, if the component circuit 12A-12F includes a plurality of pipelines, the power management mechanism may reduce the number of pipelines that are actively in use, such that operations performed by the component circuit 12A-12F are performed in a reduced number of pipelines and power is conserved through the inactivity of one or more of the pipelines. Another power management mechanism may include reducing the issue rate of operations into the pipeline, introducing "bubbles" in the pipeline in which inactivity occurs. Yet another power management mechanism may include periodic stalling of one or more pipelines or reducing the clock frequency of the clocks supplied to the pipeline temporarily. Still further, clock manipulation techniques may be used such as clock dithering, clock dividers, and clock throttling.

In an embodiment, a given component circuit such as component circuit 12A may have subcomponent circuits (e.g., subcomponent circuits 22A-22M in FIG. 1, more briefly "subcomponents"). The subcomponents 22A-22M may be relatively independent, such that power control circuit 14A may disable one or more of the subcomponents without preventing operation of the remaining components. For example, a CPU processor cluster may have a plurality of CPU processors, and one or more of the CPU processors may be disabled (e.g., stalled, clock gated, or even power gated) without preventing other CPU processors from continuing to execute instructions. In a GPU, there may be multiple symmetrical units such as shaders, rasterizers, etc. and the symmetrical units may be subcomponents. Pipelines in a component circuit may be subcomponents. In such a component circuit, the power control circuit 14A-14F may be configured to disable or reduce the performance of a subset of the subcomponents while permitting other subcomponents to operate unhindered.

In an embodiment, the power splitter circuit 10 may be programmable with the power split policy in the registers 18A-18N. In this embodiment, there may be a top level policy (register 18A) that divides the power budget among groups of component circuits 12A-12F. Component circuits 12A-12F may be grouped in any desired fashion. For example, component circuits 12A-12F may be grouped by type and the top level policy may allocate power by type (e.g., various percentages of the power budget to various types). The top level policy may be changed from time to time, such as when changes in the nature of the workload in the system occur. Examples of types may include CPU clusters, GPUs, and peripherals. Various subsets of peripherals may be types of components such as audio peripherals, video peripherals, networking peripherals, storage peripherals, etc. In another embodiment, component circuits 12A-12F may be grouped by power domain. Any grouping of component circuits 12A-12F may be used.

Within each grouping, a second level of power split may be specified in the registers 18B-18N. There may be a policy for each group in the registers 18B-18N, for example. Thus, components of the same type may be allocated power based on the top level power allocation and a corresponding policy from one of the registers 18B-18N.

In one embodiment, the system represented in FIG. 1 may be implemented on a single semiconductor substrate, or "chip." In an embodiment, the system may be part of a larger system including additional chips similar to the chip shown in FIG. 1. The D2D interface circuit 24 may be configured to communicate between chips. In an embodiment, one or more such chips may share a top level voltage controller with the system of FIG. 1. The power splitter circuit 10 may share power credits that are unused by the component circuits 12A-12F with the other power splitter circuits on the other chips, and/or may receive power credits from the other power splitter circuits for consumption in the component circuits 12A-12F.

It is noted that, while the example of FIG. 1 includes a certain number of component circuits 12A-12F, other embodiments may implement any number of component circuits 12A-12F, as desired.

Figure 2:
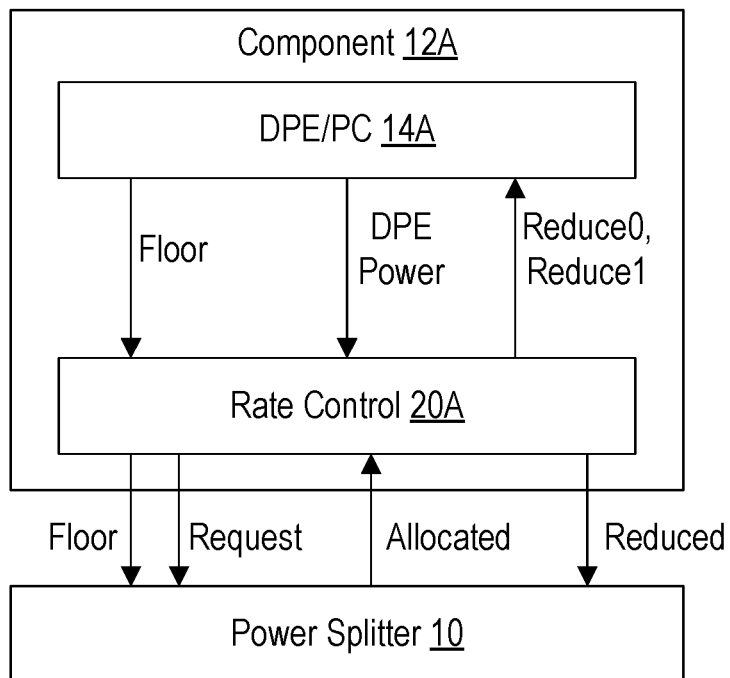
FIG. 2 is a block diagram illustrating one embodiment of a component circuit with a local power control circuit and a rate control circuit and the power splitter circuit, and one embodiment of the interfaces therebetween.

Turning now to FIG. 2, a block diagram of one embodiment of the component circuit 12A with DPE/PC circuit 12A and the rate control circuit 20A coupled to the power splitter circuit 10 is shown, with one embodiment of the interfaces therebetween. Other component circuits 12B-12F may be similar.

The DPE/PC circuit 14A may be configured to engage power management mechanisms based on one or more inputs to the PC portion of the circuit 14A to limit power consumption within the component circuit 12A. For example, the rate control circuit 20A in FIG. 2 may provide reduce0 and reduce1 inputs. Each input may request a different amount of reduced power consumption (e.g., one amount of reduced power consumption may be greater than the other). In an embodiment, the DPE portion of the DPE/PC circuit 14A may provide inputs to the PC portion based on estimated power consumption and one or more local limits based on the power budget for the power domain, for example, to manage power consumption in the component circuit 12A. In another embodiment, the DPE portion may provide power estimates and the PC portion may receive inputs from the rate control circuit 20A only. The rate control circuit 20A may request a first level of reduced power consumption using a first input of the one or more inputs (e.g., reduce0) and a second level of reduced power consumption using a second input of the one or more inputs (e.g., reduce1), wherein the second level specifies more reduction than the first level.

The DPE/PC circuit 14A may be configured to report the DPE power estimate to the rate control circuit 20A. The rate control circuit 20A may receive the DPE power estimate (e.g., a current power consumption estimate) as well as the indication of the allocated power from the power circuit 10 ("allocated" in FIG. 2), and the rate control circuit 20A may be configured to manage power in the component circuit 12A based on the DPE power estimate and the allocated power. The DPE estimate and the allocated power indication may be measured in terms of credits. Based on the estimate, the allocated power, and any remaining allocated power from previous allocations that has not been consumed, the rate control circuit 20A may generate the reduce0 and reduce1 inputs to the power control circuit. For example, the allocated power credits may be added to the remaining credits and the DPE estimate may be subtracted from the credits to generate a remaining amount of allocated power. If the remaining amount of allocated power falls below a first threshold (which may be programmable in the rate control circuit 20A), the rate control circuit 20A may assert the reduce0 input and the power control circuit 14A may engage one or more power management mechanisms. The engaged mechanisms may reduce power consumption, and possibly reduce performance. However, performance loss may be less than the performance loss when additional power management mechanisms are engaged or when an engaged power management mechanism is applied more forcefully. If the remaining amount of allocated power falls below a second threshold, lower than the first threshold, the rate control circuit 20A may assert the reduce1 input and the power control circuit 14A may engage one or more additional power management mechanisms and/or more forcefully apply the already-engaged mechanisms, further reducing power consumption and more heavily reducing performance. While two inputs are shown and two levels of reduced power consumption are implemented in the illustrated embodiment, more than two levels may be used in other embodiments. The number of power reduction control signals may be increased, and/or encoding of the signals may be used to specify the different levels of reduced power consumption. When the highest level of reduce power consumption is requested (e.g., via assertion or reduce1 in this embodiment), the power control circuit 14A may engage each of the power management mechanisms it implements, and the maximum level of reduction supported by the mechanism.

In addition to requesting reduced power consumption, the rate control circuit 20A may be configured to report that power consumption reduction is engaged (e.g., via the "reduced" output to the power splitter circuit 10). In an embodiment, the power splitter circuit 10 may be configured to record the assertions of reduced outputs from various component circuits 12A-12F for potential analysis by software to determine if the power split policy should be modified (e.g., because a given component circuit is operating under reduced power consumption more frequently than desired). In another embodiment, the power splitter circuit 10 may be configured to automatically adjust the power split policy, in hardware, based on frequency of the reduced signal assertions.

In an embodiment, the rate control circuit 20A may be configured to generate and transmit a power request ("Request" in FIG. 2) and a floor request ("Floor" in FIG. 2) to the power splitter 10. The power request may be based on the DPE power estimate from the DPE/PC circuit 14A as well as previously allocated and consumed power, for example. The DPE/PC circuit 14A may provide the floor as well, representing a minimum amount of power to ensure correct operation of the corresponding component circuit 12A. The rate control circuit 20A may transmit the floor request provided by the DPE/PC circuit 14A as the floor request to the power splitter circuit 10. The power splitter circuit 10 may be configured to ensure that the plurality of component circuits 12A-12F receive an allocation of power at least equal to a minimum of the respective floor requests and the respective power requests, and be configured to allocate remaining power budget based on the power split policy and the respective power requests.

The floor request may be dependent on a variety of factors, such as the supply voltage to the component circuit 12A and temperature. Temperature may affect the leakage current in the component circuit 12A, for example. In an embodiment, the floor request may be based on a maximum amount of reduced power consumption that the DPE/PC circuit 14A is capable of causing. In the embodiment of FIG. 2, for example, the floor request may be based on the power consumed with the reduce1 input is asserted. Viewed in another way, the floor request may be based on power that may be consumed when each of the power management mechanisms implemented by the DPE/PC circuit 14A/component circuit 12A are fully engaged. It is possible that the amount of activity in the component circuit 12A is lower than the full amount of potential activity that may occur when each of the power management mechanisms is fully engaged, in which case the floor request may be higher than strictly necessary. However, supplying the floor request may ensure that sufficient power is provided in the case that the full amount of activity is being performed. In an embodiment, the floor request may be further based on the leakage power consumed by the component circuit 12A (e.g., the leakage current experienced by inactive transistors during use in the component circuit 12A, multiplied by the supply voltage to the component circuit 12A).

In an embodiment, the power request may be less than the floor request in the case that the amount of activity actually occurring in the component circuit 12A is less than the full amount of activity that is possible when the reduce1 input is asserted. The power splitter circuit 10 may be configured to allocate the power request instead of the floor request if the power request is less than the floor request, in an embodiment. In another embodiment, the floor request may still be allocated even when it is higher than the power request, as a guard against the power request being too low (e.g., if the power estimate from the DPE portion of the circuit 14A is inaccurate).

In an embodiment, the floor request may change relatively infrequently. For example, the floor request may change with temperature changes, which may occur relatively slowly compared to the frequency at which power is requested and allocated. The floor request may change when a power state change is made for the component circuit 12A, which may increase or decrease the supply voltage and clock frequency of the component circuit 12A. Because the floor request changes infrequently, the physical interconnect (e.g., wiring) between the respective rate control circuit 20A-20N and the power splitter circuit 10 may be reduced by sharing the same physical interconnect to transmit the power request and the floor request. That is, the physical interconnect may include a shared bus to transmit the power request and the floor request. In such a case, the respective rate control circuit 20A-20F may be configured to select one of the respective power request and the respective floor request to transmit on the shared bus at a given point in time.

Figure 3:
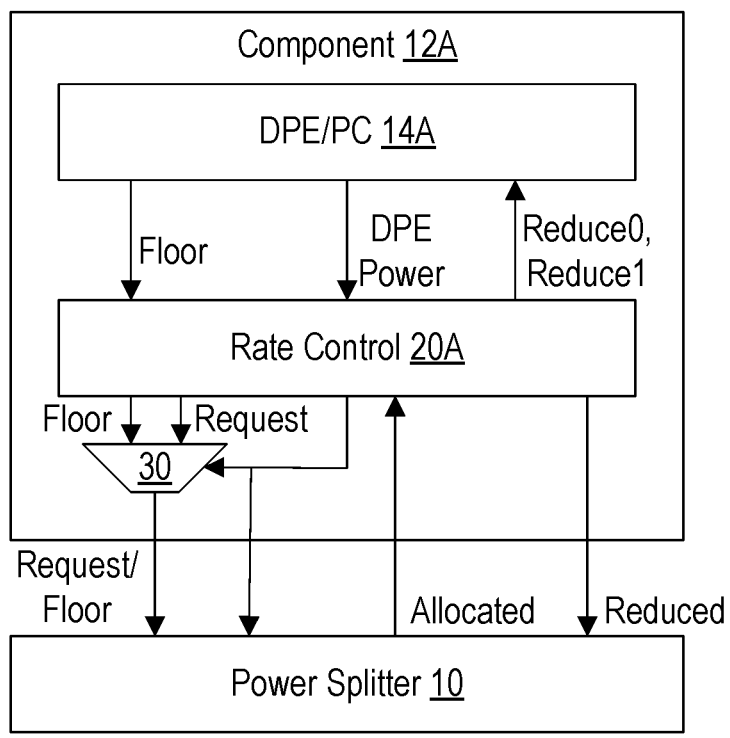
FIG. 3 is a block diagram illustrating another embodiment of a component circuit with a local power control circuit and a rate control circuit and the power splitter circuit, and another embodiment of the interfaces therebetween.

FIG. 3 is a block diagram illustrating an example of a shared physical interconnect to transmit the power request and floor request for the rate control circuit 20A/component circuit 12A. Other rate control circuits 20B-20F/component circuits 12B-12F may be similar. In the illustrated embodiment, the DPE/PC circuit 14A may provide DPE power estimates and floor requests and may receive the reduce0 and reduce1 inputs from the rate control circuit 20A, similar to the discussion above with regard to FIG. 2. The rate control circuit 20A may receive the indication of allocated power and report the power reductions via the reduced output, similar to the discussion above with regard to FIG. 2. The component circuit 12A may include a multiplexor (mux) circuit 30 to select between the power request and the floor request from the rate control circuit 20A, and may transmit the selected request on the shared request/floor bus to the power splitter circuit 10. The rate control circuit 20A may generate the mux select control for the mux 30, which may be provided as an extra bit/signal on the request/floor bus (or beside the request/floor bus) to identify whether the power request or the floor request has been transmitted.

The rate control circuit 20A may employ any mechanism for selecting between the power request and the floor request for transmission to the power splitter circuit 10. For example, the rate control circuit 20A may be configured to select the floor request based on a change in the floor request after a most recent transmission of the floor request. The rate control circuit 20A may be configured to select the power request based on a change in the power request after a most recent transmission of the power request. The rate control circuit 20A may be configured to select a least recently transmitted one of the floor request and the power request based on no change in the power request after the most recent transmission the power request and no change in the floor request after the most recent transmission of the floor request. The power splitter circuit 10 may be configured to use a previously-received request as a current request for the non-selected one of the power request and the floor request (e.g., based on the select indication provided by the rate control circuit 20A indicating which of the floor request and the power request was selected).

Figure 4:
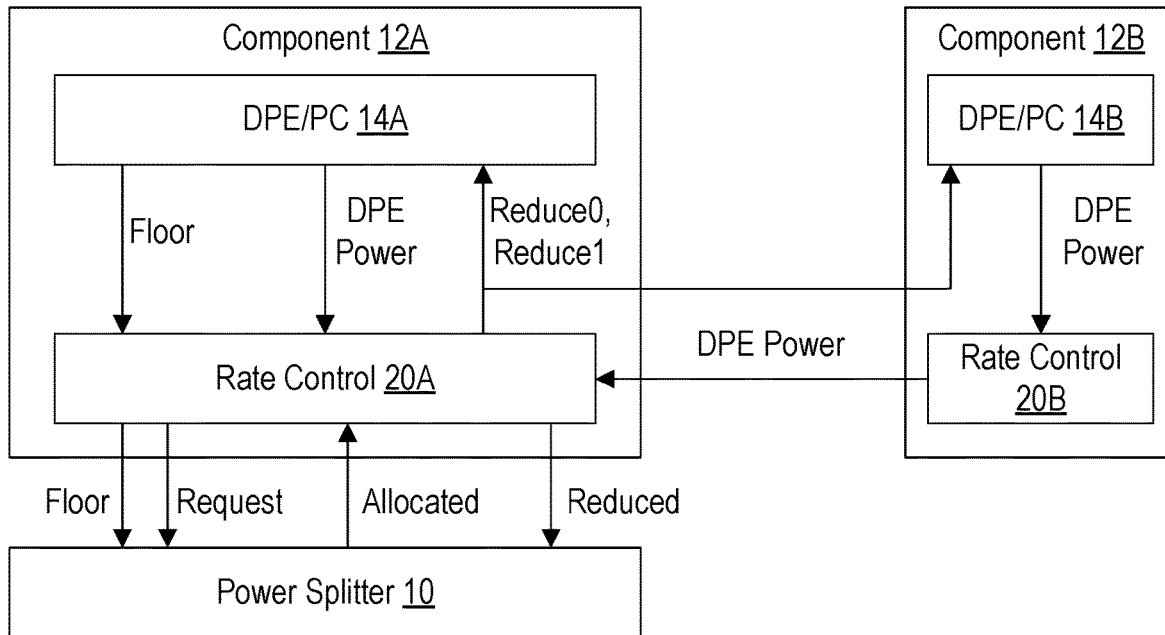
FIG. 4 is a block diagram of one embodiment of cascaded rate control circuits.

In an embodiment, the system may support cascading of two or more component circuits 12A-12F, sharing the same power and floor requests. FIG. 4 is an example showing an embodiment in which component circuits 12A and 12B are cascaded. An embodiment similar to FIG. 3, with the shared bus for request and floor, may support cascade in a similar fashion. The component circuit 12A may be the primary circuit, and thus may have the interface to the power splitter circuit 10 (e.g., the floor request and power request, and the allocated power indication). The rate control circuit 20A may also be configured to control the reduce0 and reduce1 outputs to the DPE/PC circuit 14A, which may also be provided to the DPE/PC circuit 14B in the component circuit 12B. The DPE/PC circuit 14B may provide a DPE power estimate to the rate control circuit 20B, which may forward the DPE power estimate to the rate control circuit 20A. Alternatively, the DPE/PC circuit 14B may provide the DPE power estimate directly to the rate control circuit 20A. The rate control circuit 20A may generate the power request based on the DPE power estimates from both DPE/PC circuit 14A and DPE/PC circuit 14B. In an embodiment, the component circuits 12A-12B may be instances of the same underlying design, so that the floor request generated by the rate control circuit 20A may be twice the floor request from the DPE/PC 14A. Alternatively, the DPE/PC circuit 14B may provide the floor request through the rate control circuit 20B to the rate control circuit 20A or directly to the rate control circuit 20A. Cascading the component circuits 12A-12B may reduce the number of interfaces for the power splitter circuit 10, and reduce the complexities of wiring the physical interfaces to potentially disparate locations on the semiconductor die that implements the system.

Figure 5:
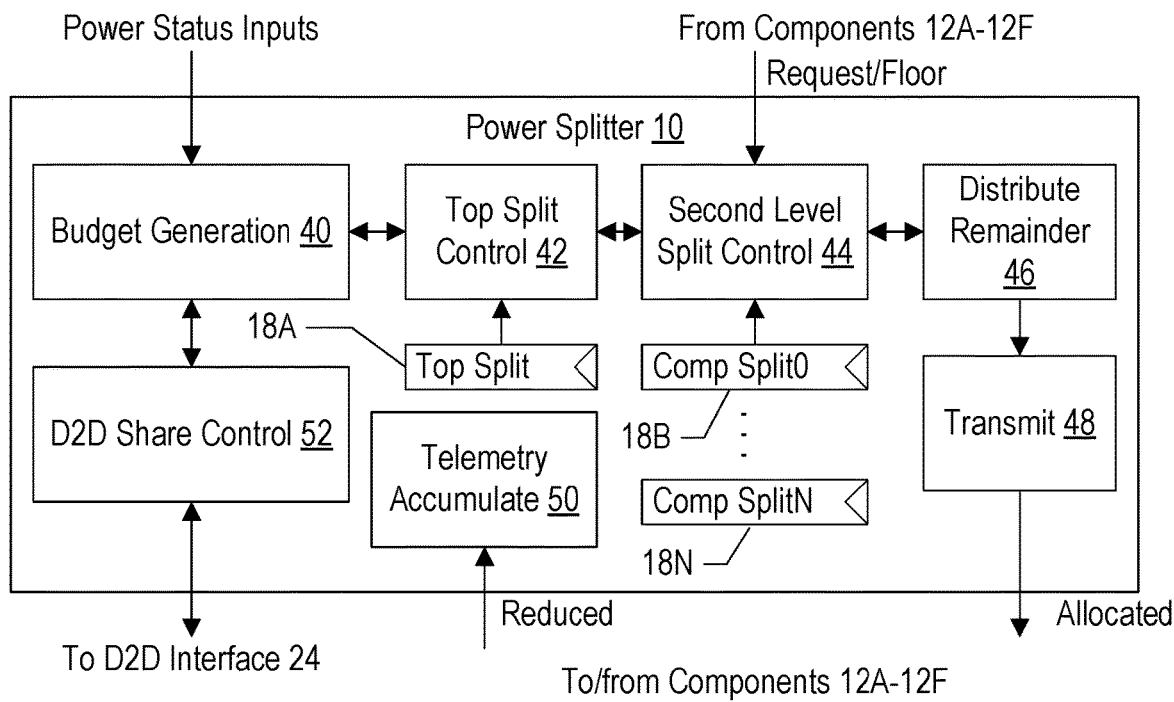
FIG. 5 is a block diagram of one embodiment of the power splitter circuit in greater detail.

FIG. 5 is a block diagram of one embodiment of the power splitter circuit 10 shown in more detail. In the illustrated embodiment, power splitter circuit 10 may include a budget generation circuit 40, a top split control circuit 42, a second level split control circuit 44, a distribute remainder circuit 46, a transmit circuit 48, a telemetry accumulate circuit 50, and a D2D share control circuit 52. The budget generation circuit 40 is coupled to the D2D share control circuit 52 and the top split control circuit 42, and to one or more power status inputs. The top split control circuit is coupled to the register 18A and to the second level split control circuit 44, which is coupled to the power requests and floor requests from the component circuits 12A-12F (and more particularly to the rate control circuits 20A-20F), the registers 18B-18N and the distribute remainder circuit 46. The distribute remainder circuit 46 is coupled to the transmit circuit 48, which is coupled to the components 12A-12F (and more particularly the rate control circuits 20A-20F) to provide the allocated power indications. The D2D share control circuit 52 is coupled to the D2D interface circuit 24, and the telemetry accumulate circuit 50 is coupled to the reduced signal from the components 12A-12F (and more particularly the rate control circuits 20A-20F).

The power status inputs may provide information indicating the amount of available power from the various power sources in the system. For example, a power manager circuit may be one of the component circuits 12A-12F, and may indicate the amount of available power based on various power states managed by the power manager, as well as inputs from the voltage regulators and/or other parts of the external power management unit that controls the voltage regulators. The inputs may provide information regarding the regulator's load, if any undervoltage events are detected due to overload of the voltage regulators, etc. Based on these inputs and programmable configuration data, the budget generation circuit may be configured to generate an indication of an available amount of power represented as, e.g., a number of power credits in which each power credit represents a specific amount of power (e.g., a number of watts). The budget generation circuit 40 may provide the available budget to the top split control circuit 42

The top split control circuit 42 may configured to split the power budget among various groups of component circuits, e.g., by component circuit type. The top split policy from the register 18A may control the split, specifying percentages of available power to be allocated to the CPU processors, GPU processors, certain specific peripherals, and the remainder of the system, for example. While considerable flexibility may be available in specifying the top split policy, at least the floor amount of power for each component circuit 12A-12F should be available via the policy to ensure correct operation. In an embodiment, the power splitter circuit 10 may be configured to override the policy to provide the floor amount of power. That is, if a given group of component circuits are allocated too little power according to the policy to provide the floor amount of power to members of the group, the power splitter circuit 10 may ensure that the component circuits receive the floor (or the request amount, if less than the floor).

The second level control circuit 44 may receive the top level power allocations from the top split control circuit 42, and may allocate each top level allocation among the components circuits in the respective group based on the component policies in the registers 18B-18N and the power request and floor request from each component circuit.

Because the second level power split is determined, at least in part, based on the power requests of the various component circuits, it is possible that there may be a remainder of unallocated power from one or more top level groups. The unallocated power may be distributed by the distribute remainder circuit 46. In an embodiment, if a group has remaining power credits and another group was unable to satisfy all power requests due to a lack of credits, the remaining power credits may be distributed as extra credits to the component circuits in the group that was short of power credits. Alternatively, the remaining credit may be divided and transmitted as extra credits to the various component circuits unsolicited. In another embodiment, remaining credits may be distributed to the D2D share control circuit 52 for sharing with another die. Combinations of the above distribution strategies may be implemented as well (e.g., distributing part of the remainder as unsolicited credits and another part of the reminder as shared credits to the another die via the D2D share control circuit 52).

The allocated power credits may be provided to the transmit circuit 48, which may be configured to transmit the allocated power credits to the component circuits 12A-12F. The transmit circuit 48 may implement delay matching, in an embodiment, so that component circuits that are physically nearer to the power splitter circuit 10 receive their power allocation at approximately the same time as component circuits 12A-12F that are physically farther from the power splitter circuit 10. For example, each power allocation may be delayed by the difference between the actually transport delay to the corresponding component circuit 12A-12F and the transport delay to a farthest one of the component circuits 12A-12F (at the granularity of a clock cycle, for example).

The telemetry accumulate circuit 50 may be configured to accumulate the reduced indications from each component circuit 12A-12F, for comparison and other analysis to potentially modify the split policies in the registers 18A-18N, for example. The telemetry accumulate circuit 50 may include counters to count the reduce signal assertions, and the counters may be software-readable.

The D2D share control circuit 52 may be coupled to the D2D interface 24. If the power splitter circuit 10 determines that there are unused credits that can be shared with another die, the D2D share control circuit 52 may be configured to transmit the credits to the D2D interface circuit 24. Additionally, if another die shares credits with the current die, the D2D share control circuit 52 may be configured to receive the shared credits form the D2D interface circuit 24 and may provide them to the budget generation circuit 40 to be added to the power budget.

Figure 6:
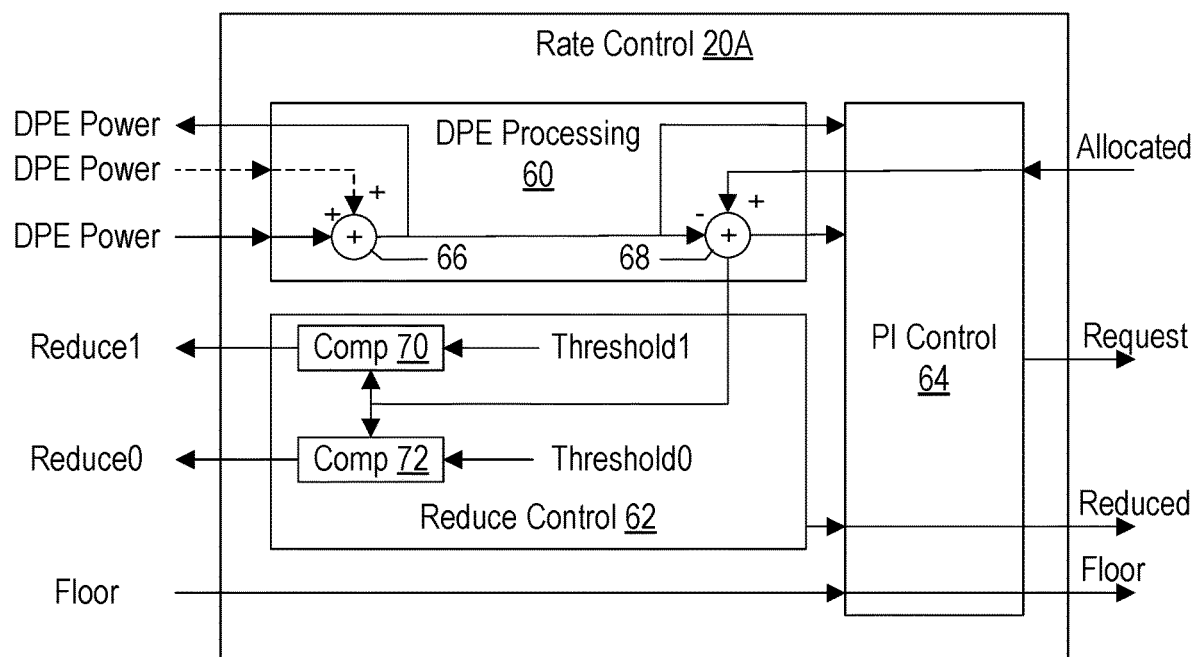
FIG. 6 is a block diagram of one embodiment of a rate control circuit in greater detail.

FIG. 6 is a block diagram of one embodiment of the rate control circuit 20A in greater detail. Other rate control circuits 20B-20F may be similar. In the illustrated embodiment, the rate control circuit 20A includes a DPE processing circuit 60, a reduce control circuit 62, and a proportional/integral (PI) control circuit 64. The DPE processing circuit 60 is coupled to the reduce control circuit 62 and the PI control circuit 64.

The DPE processing circuit 60 may be configured to receive the DPE power estimate from the DPE/PC circuit 20A, and optionally may receive the DPE power estimate from another DPE/PC circuit in a cascaded configuration (dotted line in FIG. 6). The DPE/PC circuit 20A may be configured to add the received DPE power estimates (and the DPE power estimate from another component circuit is zero if not used) (adder circuit 66), producing the DPE power estimate to be served by the rate control circuit 20A. The DPE power estimate may be output for possible use by another rate control circuit, e.g., if the component circuit 12A is cascaded to another component circuit 12B-12F where the other component circuit 12B-12F is the primary circuit. The DPE processing circuit 60 may also receive the allocated power indication from the power splitter circuit 10, and may be configured to subtract the DPE power estimate output by the adder 64 from the allocated power (adder circuit 68). The difference may be a measure of remaining power credit, along with the DPE power from the adder 66, may be provided to the PI control circuit 64 and to the reduce control circuit 62. In an embodiment, the remaining power credits may be added to an accumulated set of power credits from previous allocations, and the result may be a total number of power credits available for use by the corresponding component circuit. The accumulated credits may protect against running out of power credits when a sudden increase in the workload of the corresponding component circuit occurs, while the round-trip latency from the rate control circuit to the power splitter and back in incurred to potentially allocate more credits to support the increased workload. If there are not sufficient credits available for allocation to the increase workload, the reduced power consumption may subsequently be enforced by reduce control circuit 62. In embodiments that accumulate credits, the accumulate credits may be provided to the PI control circuit 64 in place of the remaining power credits as well.

The reduce control circuit 62 may provide the remaining power credit to comparator circuits 70 and 72, which may compare the remaining power credit to thresholds 1 and 0, respectively. If the remaining power credit drops below threshold 0 (comparator 72), the reduce control circuit may be configured to assert reduce0. If the remaining power credit drops below threshold 1 (comparator 70), the reduce control circuit may be configured to assert reduce1. In an embodiment, the reduce control circuit 62 may be configured to apply hysteresis to the comparator results, so that the reduce signals are not asserted/deasserted in rapid succession (e.g., to smooth the reduction results). The reduce control circuit 62 may further assert the reduced output to the power splitter circuit 10 if one or both the reduce0 and reduce1 signals are asserted. The floor request may also be received by the rate control circuit 20A and passed through to the mux 30 or power splitter circuit 10, depending on the embodiment.

The PI control circuit 64 may be configured to operate on the DPE power from the adder circuit 66 and/or the difference from the adder 68 (or the accumulated credits, as mentioned above) to generate the power request from the rate control circuit 20A. In the example, a proportional/integral control function may be used. The proportional control may be applied to the DPE power estimate, and the integral control may be applied to the difference provided from the DPE processing circuit 60, or vice-versa. The result of the control operation may be the power request. While PI control is provided in this embodiment other embodiments may implement other control operands including and combination of one or more of proportional, integral, and/or derivative control as well as other control options.

It is noted that, in an embodiment, the DPE processing circuit 60 and the reduce control circuit 62 may operate in the clock domain of the component circuit 12A and the PI control circuit 64 may operate in a clock domain of the power splitter circuit 10. For example, in an embodiment, the power splitter circuit 10 may operate on a generally slower clock than the component circuits 12A-12F (e.g., on the order of tens of Megahertz (MHz) for the power splitter circuit 10 versus on the order of up to Gigahertz (GHz) for the component circuits 12A-12F). Thus, there may be a clock domain crossing within the rate control circuit 20A (e.g., at the boundary between the PI control circuit 64 and the DPE processing circuit 60/reduce control circuit 62). Power allocations by the power splitter circuit 10 may thus be power allocated for one clock period of the power splitter clock, and the power requests and floor requests may be for the next clock period.

Figure 7:
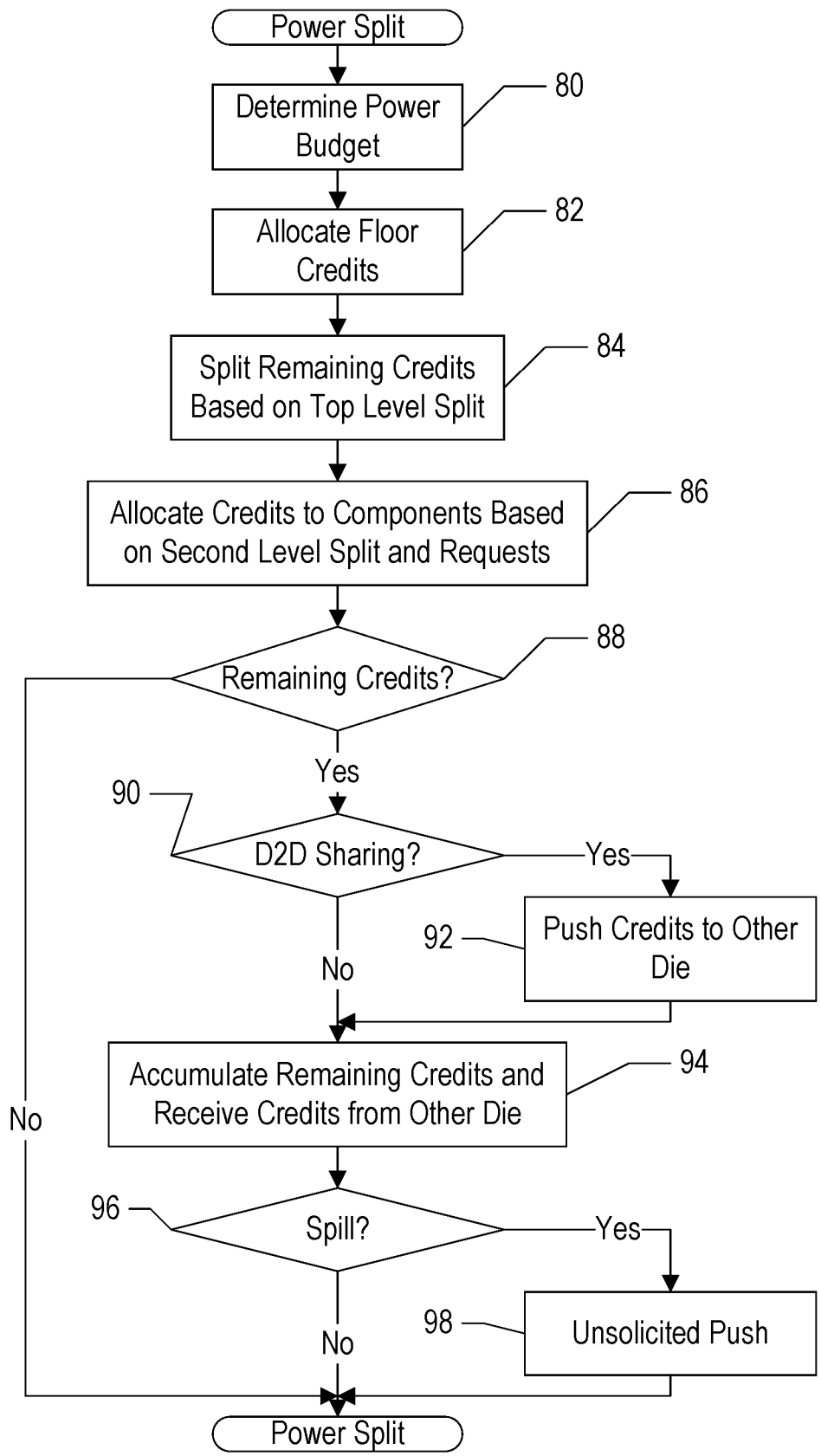
FIG. 7 is a flowchart illustrating operation of one embodiment of the power splitter circuit.

FIG. 7 is a flowchart illustrating a simplified view of the operation of one embodiment of the power splitter circuit 10. While the blocks are shown in a particular order for ease of understanding, other orders may be used. Blocks may be performed in parallel by combinatorial logic within the power splitter circuit 10. Blocks, combinations of blocks, and/or the flowchart as a whole may be pipelined over multiple clock cycles. The power splitter circuit 10 may be configured to implement the operation shown in FIG. 7.

The power splitter circuit 10 may be configured to determine the power budget to be allocated (block 80). For example, the power budget may be based on various power state power status inputs, as discussed above. The power budget may be based on various programmable values (e.g., an initial budget), which may be modified based on the power status inputs. For example, the power status inputs may indicate that power reduction is requested by external (to the integrated circuit) hardware such as the power management unit, even though the on-system hardware hasn't detected an issue yet. The power spitter circuit 10 may reduce the budget in such cases. In an embodiment, the first level voltage regulator may operate with fewer than a maximum number of phases active (e.g., a single-phase mode), and the power splitter circuit 10 may reduce the budget based on the load current that the reduced number of phases may support (e.g., a reduced budget may be provided to correspond to the reduced number of phases, and the power splitter circuit may switch to the reduced budged based on an input indicating the reduced phase mode is active. In an embodiment, the initial budget may be programmed to different values by controlling software during use (e.g., within a predefined range that has been tested and known to be safe, and the predefined range may be enforced by the power splitter circuit 10 hardware). Controlling software may modify the budget to reduce or eliminate the occurrence of the power status inputs causing budget reductions, which may improve overall efficiency.

The power splitter circuit 10 may allocate credits to satisfy the floor requests (block 82). As mentioned previously, in some embodiments, the floor request may be overridden by a lower power request and instead the lower power request credits may be allocation. Power budget credits that remain after the floor allocation may be allocated based on the top level split priority (block 84) and then may be allocated to the various component circuits based on the second level policy and the power requests (block 86).

It is noted that the above allocation of credits is somewhat simplified, and may be implemented as described or in different ways. For example, the credits may be allocated according to the top split, and then allocated to floor and power requests at the second level. If there are insufficient credits to allocate at the second level for all floor requests, additional credits may be added (e.g., from a reserve pool, or borrowing from future credits up to a predetermined maximum amount) to satisfy the floor requests. Any mechanism may be used.

If there are no remaining credits from the allocation represented by blocks 80, 82, 84, and 86 (decision block 88, "no" leg), allocation may be finished for this iteration. If there are remaining credits (decision block 88, "yes" leg), the power splitter circuit 10 may be configured to attempt to distribute the remaining credits. If D2D sharing is enabled (e.g., the system is a multi-die system, and in some cases D2D sharing may be selectively enabled via programmable configuration) (decision block 90, "yes" leg), the power splitter circuit 10 may push credits to another die (block 92). Less than all of the remaining credits may be shared in some cases. For example, there may be a programmable limit to the number of credits that may be shared, or a percentage of the remaining credits may be shared. Any mechanism for determining a number of credits to share may be used.

Remaining credits, if any, may be accumulated along with any credits shared from another die for use in a subsequent allocation (block 94). The number of remaining credits that may be accumulated may be limited (e.g., a programmable limit). Any credits over the limit would then be "spilled" (e.g., lost because there is no allocation of the credits and no accumulation). If credits are to be spilled (decision block 96, "yes" leg), the power splitter circuit 10 may push the credits to the rate control circuits 20A-20F unsolicited, as they may be potentially useful (block 98). If the rate control circuits 20A-20F are unable to allocate the credits, they may then be spilled.

Figure 8:
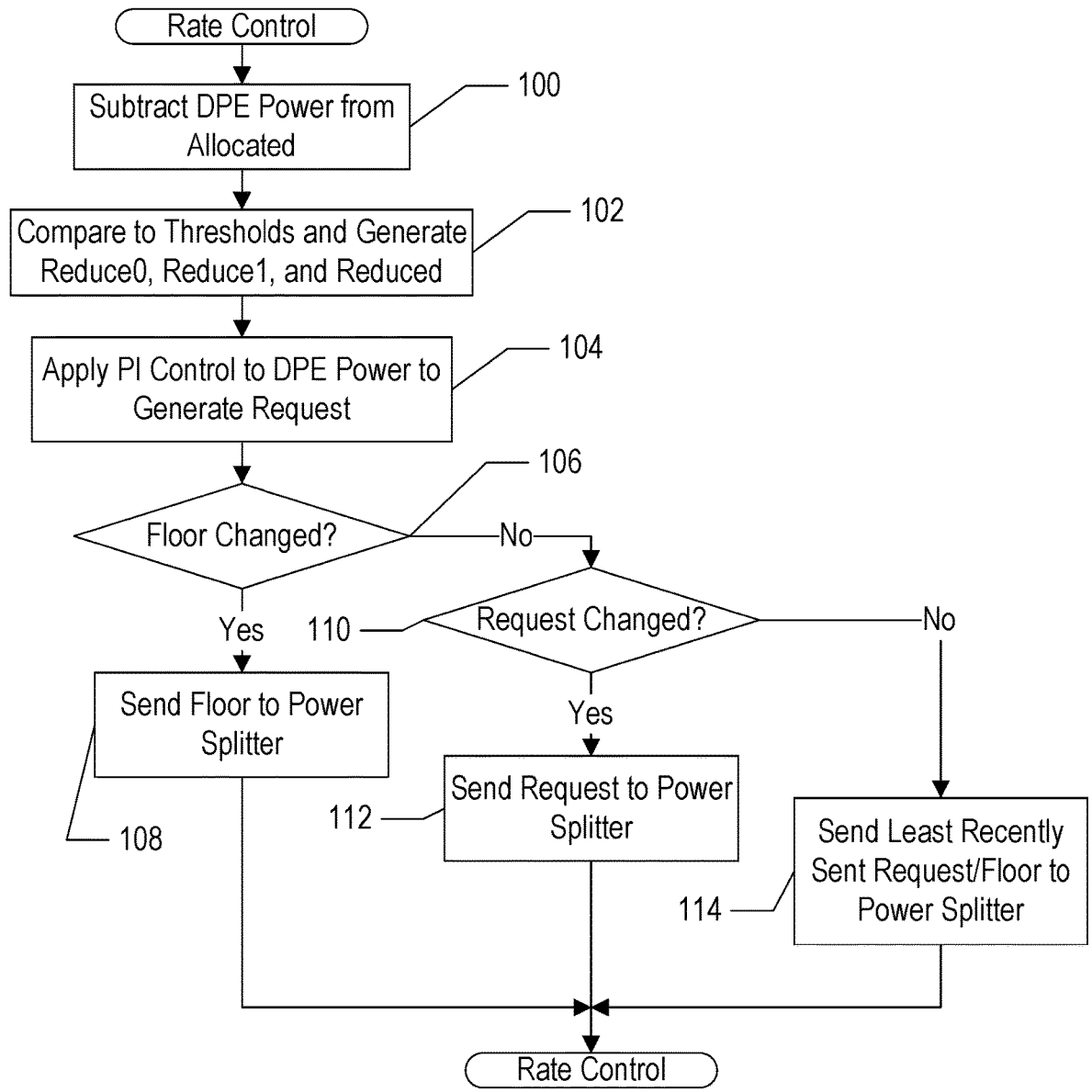
FIG. 8 is a flowchart illustrating operation of one embodiment of the rate control circuit.

FIG. 8 is a flowchart illustrating a simplified view of the operation of one embodiment of a given rate control circuit 20A-20F. While the blocks are shown in a particular order for ease of understanding, other orders may be used. Blocks may be performed in parallel by combinatorial logic within the given rate control circuit 20A-20F. Blocks, combinations of blocks, and/or the flowchart as a whole may be pipelined over multiple clock cycles. The given rate control circuit 20A-20F may be configured to implement the operation shown in FIG. 8. In an embodiment, each rate control circuit 20A-20F may implement the operation shown in FIG. 8 in a parallel based on respective allocated power credits from the power splitter circuit 10. Accordingly, the description of FIG. 8 will simply refer to the "rate control circuit."

The rate control circuit may be configured to subtract the DPE power estimate (including any cascaded component circuits, if applicable) from the allocated power indication received from the power splitter circuit 10 (block 100). The rate control circuit may be configured to compare the result to the thresholds, and may be configured to generate the reduce0, reduce1, and reduced signals (block 102). The rate control circuit may be configured to apply the PI control to the DPE power estimate and the remainder to generate the power request (block 104). If the floor request has changed from the most recent time the floor request was sent to the power splitter circuit (decision block 106, "yes" leg), the rate control circuit may be configured to select the floor request and send the floor request to the power splitter circuit 10 (block 108). If the floor request has not changed from the most recent time the floor request was transmitted (decision block 106, "no" leg) and the power request has changed from the most recent time the power request was transmitted (decision block 110, "yes" leg), the rate control circuit may be configured to select the power request and send the power request to the power splitter circuit 10 (block 112). If neither has changed (decision blocks 106 and 110, "no" legs), the rate control circuit may select the least recently sent one of the floor request and the power request and may send the selected request to the power splitter circuit 10 (block 114). The operation illustrated by blocks 106, 108, 110, 112, and 114 may be implemented for a shared power request/floor request interface. Embodiments that have separate buses for power request and floor request may eliminate the operation of blocks 106, 108, 110, 112, and 114.

Figure 9:
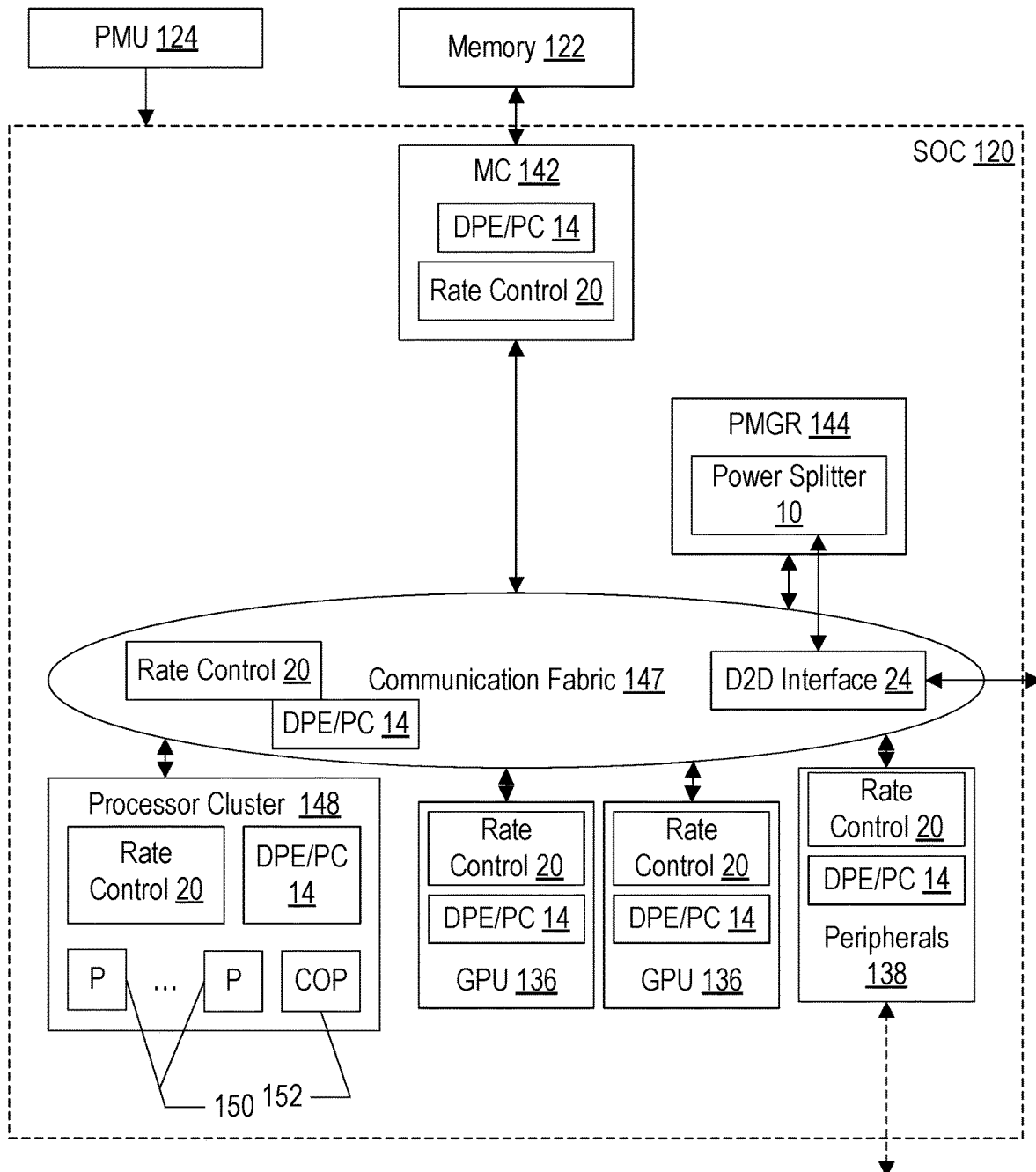
FIG. 9 is a block diagram of one embodiment of an SOC.

FIG. 9 is a block diagram of one embodiment a system that includes a system on a chip (SOC) 120 coupled to a memory 122 and a power management unit (PMU) 124. The PMU 124 may be configured to supply power to the SOC 120 and other components that may be included in the system, such as the memory 122. For example, the PMU 124 may be configured to generate one or more supply voltages to power the SOC 120, and may further be configured to generate supply voltages for other components of the system, not shown in FIG. 9. More particularly, the PMU 124 may include one or more first level voltage controllers that supply second level voltage controllers, which supply the various independent voltage domains of the SOC 120.

As implied by the name, the components of the SOC 120 may be integrated onto a single semiconductor substrate as an integrated circuit "chip." In the illustrated embodiment, the components of the SOC 120 include at least one processor cluster 148, a plurality of graphics processing units (GPU) 136, one or more peripheral components such as peripheral components 138 (more briefly, "peripherals"), a memory controller 142, a power management circuit (PMGR) 144, and a communication fabric 147. The components 148, 136, 138, 142, and 144 may all be coupled to the communication fabric 147. The memory controller 142 may be coupled to the memory 122 during use. In some embodiments, there may be more than one memory controller coupled to a corresponding memory. The memory address space may be mapped across the memory controllers in any desired fashion in such embodiments. In the illustrated embodiment, the processor cluster 148 may include a plurality of processors (P) 150. The processors 150 may form the central processing units (CPU(s)) of the SOC 120. The processor cluster 148 may further include one or more coprocessors (e.g., the coprocessor 152 in FIG. 9) that may be optimized for a subset of the processor instruction set and may be used by the processors 150 to execute instructions in the subset. For example, the coprocessor 152 may be a matrix engine optimized to perform vector and matrix operations.

In this embodiment, the memory controller(s) 142, the communication fabric 147, the peripherals 138, the GPUs 136, and the processor cluster 148 may all be instances of component circuits 12A-12F. Accordingly, as shown, the memory controller(s) 142, the communication fabric 147, the peripherals 138, the GPUs 136, and the processor cluster 148 each include instances of the DPE/PC circuit 14 and the rate control circuit 20. Any subset of the memory controller(s) 142, the communication fabric 147, the peripherals 138, the GPUs 136, and the processor cluster 148 may be component circuits in other embodiments. The PMGR 144 may include the power splitter circuit 10, and the D2D interface circuit 24 may be part of the communication fabric 147.

The various component circuits in FIG. 9 may be different types of component circuits, and thus the power management mechanisms that are implemented may vary. For example, the DPE/PC 14 in the processor cluster 148 may employ mechanisms such as deactivating one or more of the processors 150 and/or deactivating one or more pipelines in a processor 150. Instruction issue rates may be reduced, inserting bubbles in the pipelines so that the corresponding circuitry is not actively evaluating each cycle. Any set of one or more power management mechanisms may be used. Similarly, the GPUs 136 may reduce the number of active pipelines, limit instruction issue rates, and/or implement any other power management mechanisms such as clock manipulations (clock dithering, clock dividing, etc.).

The PMGR 144 may be configured to control the supply voltage magnitudes requested from the external PMU 124. There may be multiple supply voltages generated by the PMU 124 for the SOC 120, for various independent power domains. The PMGR 144 may be under direct software control (e.g., software may directly request the power up and/or power down of components) and/or may be configured to monitor the SOC 120 and determine when various components are to be powered up or powered down. Various power states within a component (e.g., power states of the processors 150) may be controlled via the PMGR 144, as well as the sequencing of changes to power states, different request voltage and frequencies, etc.

As mentioned above, the processor cluster 148 may include one or more processors 150 that may serve as the CPU of the SOC 120. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors.

Generally, a processor may include any circuitry and/or microcode configured to execute instructions defined in an instruction set architecture implemented by the processor. Processors may encompass processor cores implemented on an integrated circuit with other components as a system on a chip (SOC 120) or other levels of integration. Processors may further encompass discrete microprocessors, processor cores and/or microprocessors integrated into multichip module implementations, processors implemented as multiple integrated circuits, etc.

The memory controller 142 may generally include the circuitry for receiving memory operations from the other components of the SOC 120 and for accessing the memory 122 to complete the memory operations. The memory controller 142 may be configured to access any type of memory 122. For example, the memory 122 may be static random-access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g., LPDDR, mDDR, etc.). The memory controller 142 may include queues for memory operations, for ordering (and potentially reordering) the operations and presenting the operations to the memory 122. The memory controller 142 may further include data buffers to store write data awaiting write to memory and read data awaiting return to the source of the memory operation. In some embodiments, the memory controller 142 may include a memory cache to store recently accessed memory data. In SOC implementations, for example, the memory cache may reduce power consumption in the SOC by avoiding reaccess of data from the memory 122 if it is expected to be accessed again soon. In some cases, the memory cache may also be referred to as a system cache, as opposed to private caches such as an L2 cache or caches in the processors, which serve only certain components. Additionally, in some embodiments, a system cache need not be located within the memory controller 142.

The peripherals 138 may be any set of additional hardware functionality included in the SOC 120. For example, the peripherals 138 may include video peripherals such as an image signal processor configured to process image capture data from a camera or other image sensor, video encoder/decoders, scalers, rotators, blenders, display controller, etc. The peripherals may include audio peripherals such as microphones, speakers, interfaces to microphones and speakers, audio processors, digital signal processors, mixers, etc. The peripherals may include interface controllers for various interfaces external to the SOC 120 including interfaces such as Universal Serial Bus (USB), peripheral component interconnect (PCI) including PCI Express (PCIe), serial and parallel ports, etc. The interconnection to external device is illustrated by the dashed arrow in FIG. 9 that extends external to the SOC 120. The peripherals may include networking peripherals such as media access controllers (MACs). Any set of hardware may be included.

The communication fabric 147 may be any communication interconnect and protocol for communicating among the components of the SOC 120. The communication fabric 147 may be bus-based, including shared bus configurations, cross bar configurations, and hierarchical buses with bridges. The communication fabric 147 may also be packet-based, and may be hierarchical with bridges, cross bar, point-to-point, or other interconnects.

It is noted that the number of components of the SOC 120 (and the number of subcomponents for those shown in FIG. 9, such as the processors 150 in each processor cluster 148 may vary from embodiment to embodiment. Additionally, the number of processors 150 in one processor cluster 148 may differ from the number of processors 150 in another processor cluster 148 when multiple processor clusters are included. There may be more or fewer of each component/subcomponent than the number shown in FIG. 9.

In accordance with the above, an embodiment of an integrated circuit may comprise a power manager circuit comprising a power splitter circuit; a plurality of component circuits; and one or more processor clusters. A given processor cluster may comprise a plurality of processors, a digital power estimation (DPE) circuit coupled to the plurality of processors and configured to estimate power consumed in the plurality of processors, and a rate control circuit coupled to the plurality of processors. The power splitter circuit maybe configured to allocate power to the plurality of component circuits and the one or more processor clusters from a power budget for the integrated circuit. The power splitter circuit may be configured to communicate an indication of power allocated for the given processor cluster to the rate control circuit. The rate control circuit may be configured to manage power consumption in the corresponding component circuits based on the indication of the power allocated and based on the estimated power consumption from the DPE circuit. The given processor cluster may further comprise a power control circuit configured to limit power consumption by the plurality of processors based on one or more inputs requesting reduced power consumption. The rate control circuit may be configured to manage power consumption using the one or more inputs.

Figure 10:
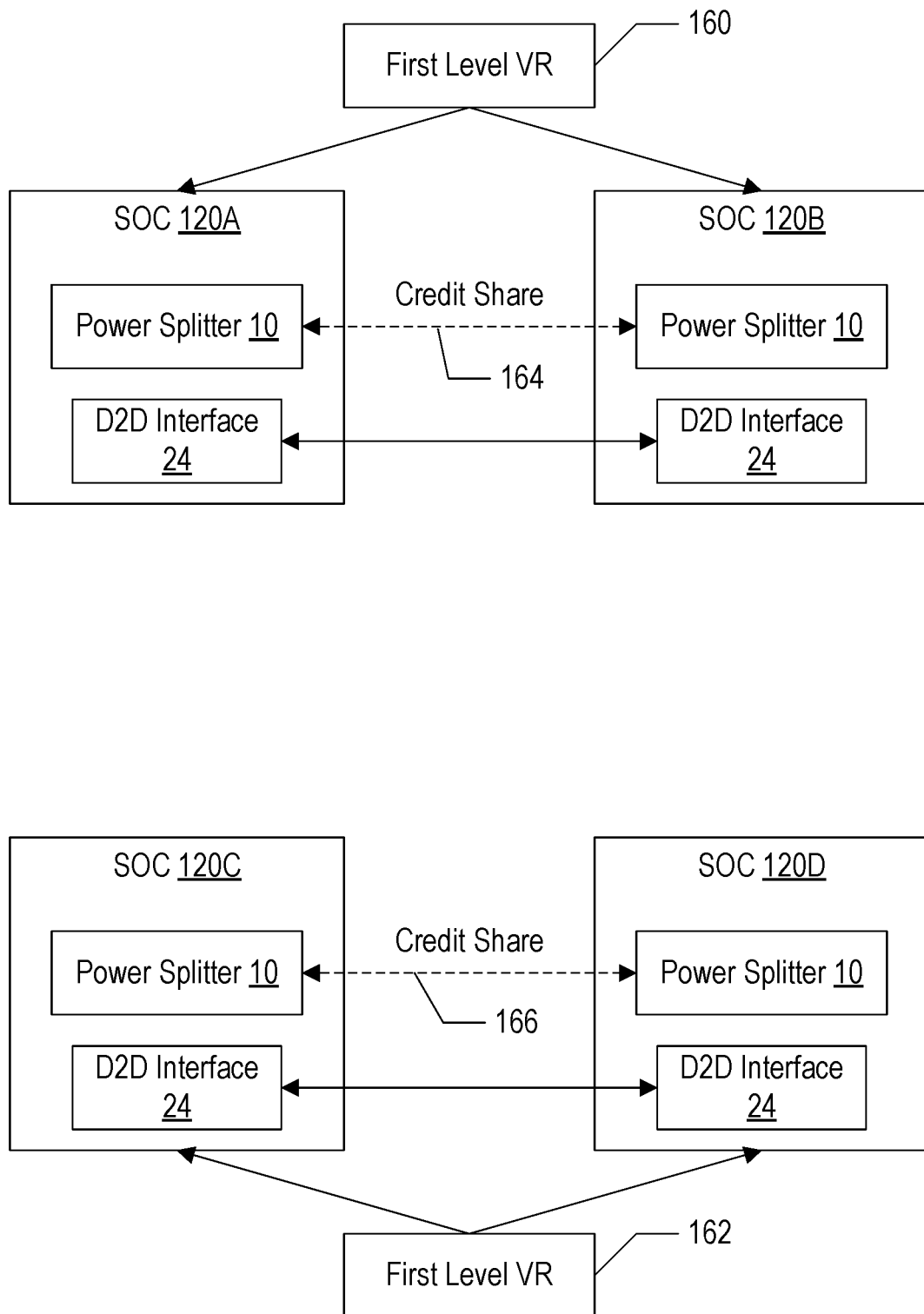
FIG. 10 is a block diagram of one embodiment of a system including multiple SOCs.

FIG. 10 is a block diagram of one embodiment of a system include a plurality of SOCs 120A-120D is shown. Each SOC 120A-120D includes a power splitter circuit 10 and a D2D interface circuit 24. The SOCs 120A-120B are supplied by a first level voltage regulator (VR) 160 (through second level voltage regulators, not shown in FIG. 10), and the SOCs 120C-120D are supplied through a first level voltage regulator 162 (through second level voltage regulators, not shown in FIG. 10). Because the SOCs 120A-120B share the same first level voltage regulator 160, the power splitter circuits 10 may share credits and still protect the capacity of the first level voltage regulator 160. Similarly, the SOCs 120C-120D share the same first level voltage regulator 162, the power splitter circuits 10 may share credits and still protect the capacity of the first level voltage regulator 162. The possible sharing is illustrated via the dotted lines 164 and 166 in FIG. 10, although as discussed above the communication may actually be over the D2D interface circuits 24. The SOCs 120A-120B may also communicate with the SOCs 120C-120D over the D2D interfaces, but may not share power credits in an embodiment. It is noted that, while two SOCs (120A-120B or 120C-120D) are shown as sharing credits, more than two SOCs may share credits in other embodiments. For example, if more than two SOCs share the same first level voltage regulator, those SOCs may share credits.

Accordingly, in an embodiment, a system may comprise a plurality of integrated circuits implemented on respective semiconductor substrates (e.g., SOCs). The plurality of integrated circuits may be coupled via an inter-chip interconnect. A respective integrated circuit of the plurality of integrated circuits comprises a plurality of component circuits, wherein respective component circuits of the plurality of component circuits comprise respective rate control circuits. The respective integrated circuit may further comprise a power splitter circuit coupled to the plurality of component circuits. The power splitter circuit may be configured to allocate power to the plurality of component circuits based on a power budget for the respective integrated circuit. The respective rate control circuits may be configured to generate respective power requests and respective floor requests, wherein the respective floor requests indicate minimum amounts of power that the corresponding component circuits will consume. The power splitter circuit may be configured to ensure that the plurality of component circuits receive an allocation of power at least equal to the respective floor requests and to allocate remaining power budget based on a power split policy and the respective power requests. The power splitter circuit may be configured to transmit an indication of an unallocated portion of the remaining power budget to the power splitter circuit in another integrated circuit of the plurality of integrated circuits over the inter-chip interconnect. In an embodiment, the power splitter circuit in the respective integrated circuit is configured to receive a second indication of an unallocated portion of the remaining power budget from the power splitter circuit in another integrated circuit of the plurality of integrated circuits, and wherein the power splitter circuit may be configured to include the unallocated portion in a subsequent power allocation. In an embodiment, the system may include a plurality of voltage regulators, wherein a given voltage regulator of the plurality of voltage regulators is configured to supply power to a subset of the plurality of integrated circuits. The power splitter circuits in the respective integrated circuits in the subset may be configured to transmit the indications of the unallocated portion among the subset.

Figure 11:
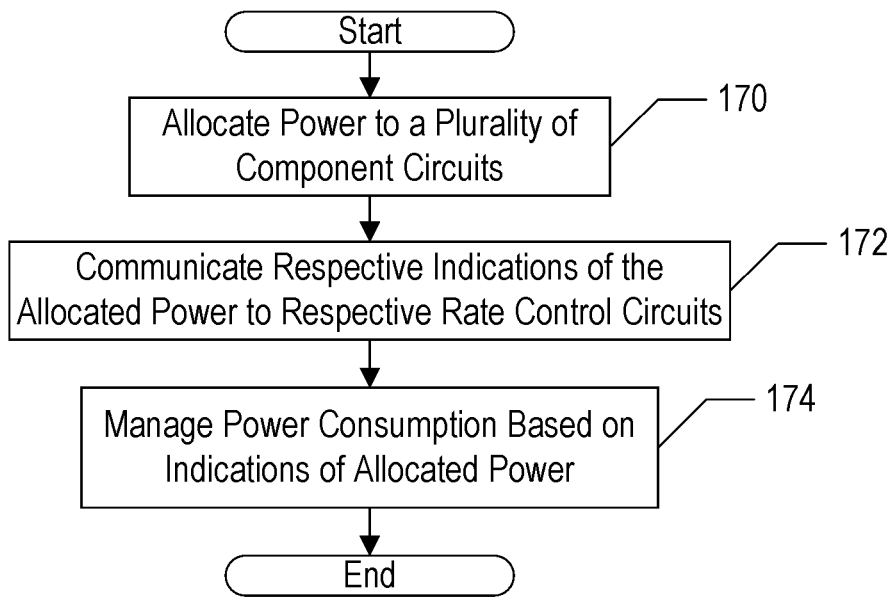
FIG. 11 is a flowchart illustrating one embodiment of a method.

Turning now to FIG. 11, a flowchart is shown illustrating one embodiment of a method. In an embodiment, the method may comprise allocating power to a plurality of component circuits by a power splitter circuit (block 170). A given component circuit of the plurality of component circuits is included in one of a plurality of independent power domains, and the plurality of component circuits comprise respective rate control circuits. The method may further include communicating respective indications of the allocated power from the power splitter circuit to the respective rate control circuits (block 172). The method may still further include managing power consumption in the plurality of component circuits by the respective rate control circuits based on the respective indication of the allocated power provided to the respective rate control circuits (block 174). In an embodiment, the given component circuit may include a power control circuit configured to limit power consumption by one or more circuits within the given component circuit based on one or more inputs requesting reduced power consumption. Managing power consumption in the plurality of component circuits may comprise using the one or inputs by the respective rate control circuit. In an embodiment, using the one or more inputs may comprise requesting a first level of reduced power consumption using a first input of the one or more inputs; and requesting a second level of reduced power consumption using a second input of the one or more inputs, wherein the second level is more reduced than the first level. In an embodiment, requesting the first level of reduced power consumption may be based on a remaining amount of the allocated power falling below a first threshold. In an embodiment, requesting the second level of reduced power consumption may be based on the remaining amount of the allocated power falling below a second threshold.

Figure 12:
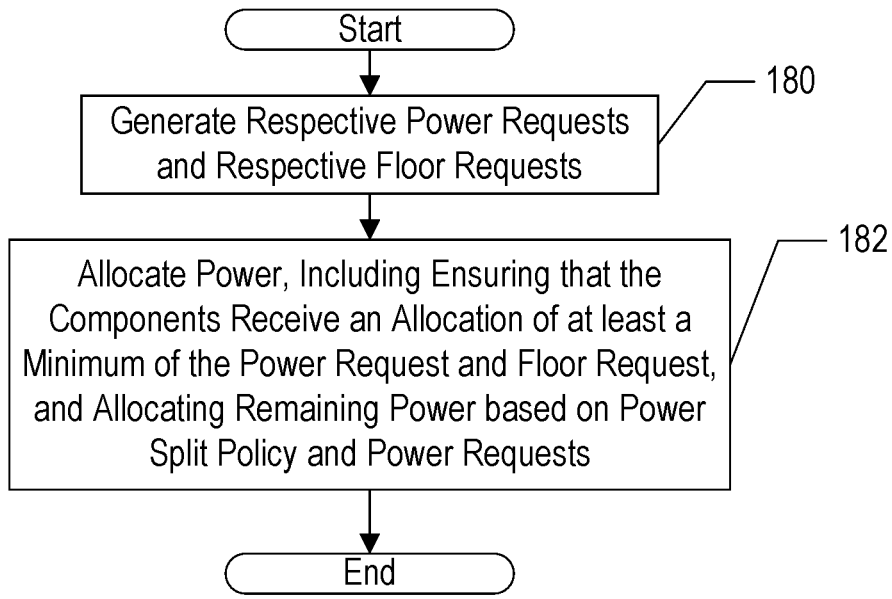
FIG. 12 is a flowchart illustrating another embodiment of a method.

FIG. 12 is a flowchart illustrating another embodiment of a method. In an embodiment, the method may comprise generating respective power requests and respective floor requests for a power splitter circuit in a system by respective rate control circuits in respective component circuits of a plurality of component circuits in the system (block 180). The respective floor requests may indicate minimum amounts of power consumable by the corresponding component circuits. The method may further comprise allocating power to the plurality of component circuits by the power splitter circuit (block 182). The allocating may comprise ensuring that the plurality of component circuits receive an allocation of power at least equal to a minimum of the respective floor request and the respective power request; and allocating remaining power budget based on a power split policy and the respective power requests. In an embodiment, a given component circuit of the plurality of component circuits may include a power control circuit configured to caused reduced power consumption in the given component circuit, and the respective floor request for the given component circuit may be based on a maximum amount of reduced power consumption that the power control circuit is capable of causing. In an embodiment, the given component circuit may experience a leakage current in inactive transistors during use, and the respective floor request for the given component circuit may be further based on leakage power consumed through the leakage current. In an embodiment, a physical interconnect between the power splitter circuit and the respective rate control circuit in a given component circuit of the plurality of component circuits may include a shared bus to transmit the respective power request and the respective floor request, and the method may further comprise selecting one of the respective power request and the respective floor request to transmit on the shared bus. In an embodiment, selecting one of the respective power request and the respective floor request to transmit on the shared bus may comprise selecting the respective floor request based on a change in the respective floor request after a most recent transmission of the respective floor request; selecting the respective power request based on a change in the respective power request after a most recent transmission of the respective power request; and selecting a least recently transmitted one of the respective floor request and the respective power request based on no change in the respective power request after the most recent transmission the respective power request and no change in the respective floor request after the most recent transmission of the respective floor request.

Computer System

Figure 13:
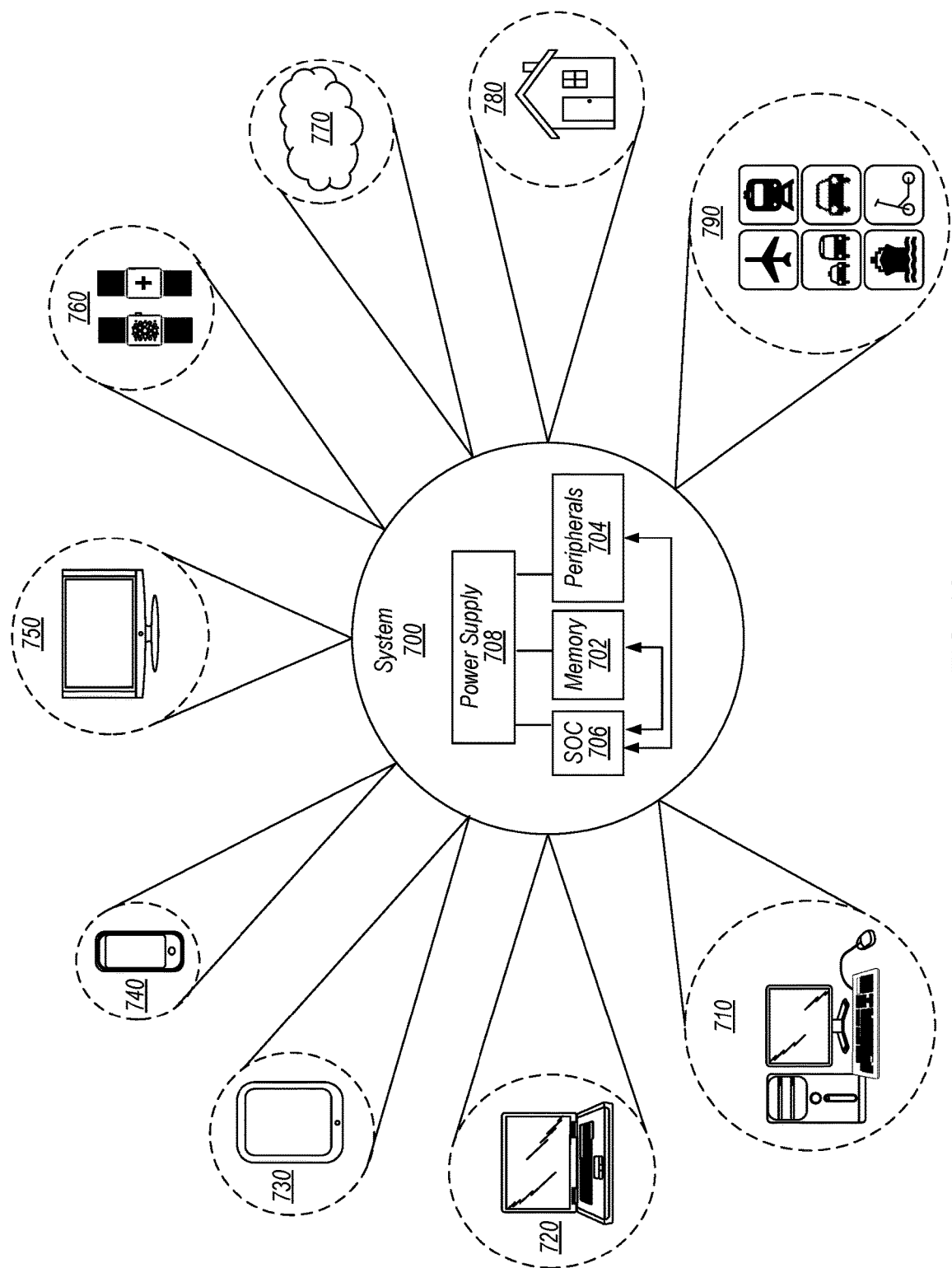
FIG. 13 is a block diagram of various embodiments of systems that may employ the SOC(s).

Turning next to FIG. 13, a block diagram of one embodiment of a system 700 is shown. In the illustrated embodiment, the system 700 includes at least one instance of a system on a chip (SOC) 706 coupled to one or more peripherals 704 and an external memory 702. A power supply (PMU) 708 is provided which supplies the supply voltages to the SOC 706 as well as one or more supply voltages to the memory 702 and/or the peripherals 704. In some embodiments, more than one instance of the SOC may be included (and more than one memory 702 may be included as well). The memory 702 may include the memory 122 illustrated in FIG. 9, in an embodiment. The SOC 706 may be an instance of the SOC 120 illustrated in FIG. 9, in an embodiment. The PMU 708 may include the PMU 124 shown in FIG. 9, in an embodiment and may include the voltage regulators 160 and 162 shown in FIG. 10, in an embodiment.

The peripherals 704 may include any desired circuitry, depending on the type of system 700. For example, in one embodiment, the system 704 may be a mobile device (e.g., personal digital assistant (PDA), smart phone, etc.) and the peripherals 704 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system (e.g., desktop personal computer, laptop, workstation, net top etc.).

The external memory 702 may include any type of memory. For example, the external memory 702 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 702 may include one or more memory modules to which the memory devices are mounted, such as single inline memory modules (SIMMs), dual inline memory modules (DIMMs), etc. Alternatively, the external memory 702 may include one or more memory devices that are mounted on the SOC 706 in a chip-on-chip or package-on-package implementation.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 13 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 13 are illustrative only and are not intended to be limiting. Other devices are possible and are contemplated.

Computer Readable Storage Medium

Figure 14:
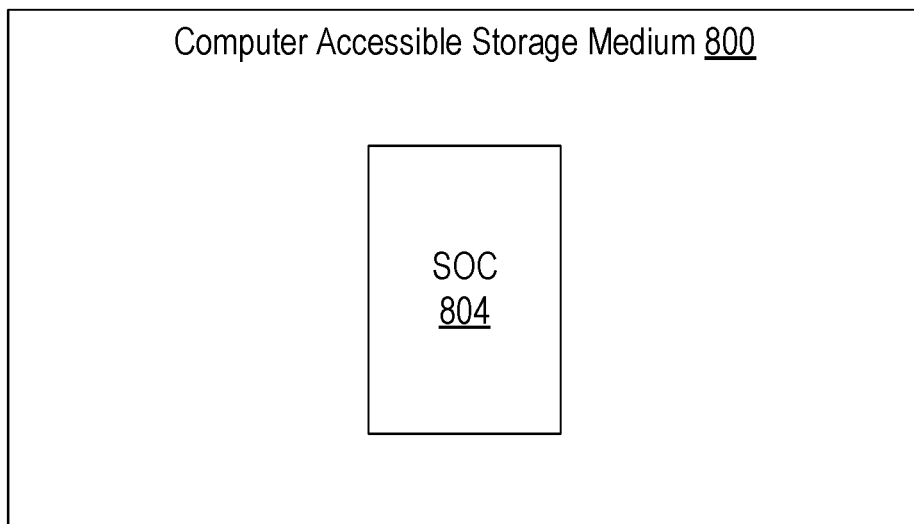
FIG. 14 is a computer accessible medium.

Turning now to FIG. 14, a block diagram of one embodiment of a computer readable storage medium 800 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 14 may store a database 804 representative of the SOC 120. Generally, the database 804 may be a database which can be read by a program and used, directly or indirectly, to fabricate the hardware comprising the SOC 120. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 120. The netlist may then be placed and routed to produce a data set describing geometric shapes to be applied to masks. The masks may then be used in various semiconductor fabrication steps to produce a semiconductor circuit or circuits corresponding to the SOC 120. Alternatively, the database 804 on the computer accessible storage medium 800 may be the netlist (with or without the synthesis library) or the data set, as desired.

While the computer accessible storage medium 800 stores a representation of the SOC 10, other embodiments may carry a representation of any portion of the SOC 120, as desired, including any subset of the components shown in FIG. 9. The database 804 may represent any portion of the above.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other component circuits, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/component circuits may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital component circuits, analog component circuits, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/component circuits and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement. The arrangement of such circuits/units/component circuits with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/component circuits in a hardware description language (HDL) such as Verilog or VHDL. The HDL description is often expressed in a fashion that may appear to be functional. But to those of skill in the art in this field, this HDL description is the manner that is used transform the structure of a circuit, unit, or component circuit to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A system comprising:
   a plurality of component circuits, wherein respective component circuits of the plurality of component circuits comprise respective rate control circuits; and
   a power splitter circuit coupled to the plurality of component circuits, wherein:
      the power splitter circuit is configured to allocate power to the plurality of component circuits based on a power budget for the system;
      the respective rate control circuits are configured to generate respective power requests and respective floor requests for the power splitter circuit, wherein the respective floor requests indicate minimum amounts of power consumable by the corresponding component circuits;
      the power splitter circuit is configured to ensure that the plurality of component circuits receive an allocation of power at least equal to a minimum of the respective floor requests and the respective power requests; and
      the power splitter circuit is configured to allocate remaining power budget based on a power split policy and the respective power requests, wherein the power split policy includes:
         a first level policy that specifies a split of the remaining power budget among respective types of component circuits; and
         a second level policy that specifies, for an amount allocated to a given type of component circuit, a split of the amount among component circuits of the given type.

2. The system as recited in claim 1 wherein a given component circuit of the plurality of component circuits includes a power control circuit that is configured to cause reduced power consumption in the given component circuit, and wherein the respective floor request for the given component circuit is based on a maximum amount of reduced power consumption that the power control circuit is capable of causing.

3. The system as recited in claim 2 wherein the given component circuit experiences a leakage current in inactive transistors during use, and wherein the respective floor request for the given component circuit is further based on leakage power consumed through the leakage current.

4. The system as recited in claim 2 wherein the given component circuit further comprises a digital power estimation (DPE) circuit configured to estimate power consumption in the given component circuit, and wherein the respective power request is based on the estimated power consumption from the DPE circuit.

5. The system as recited in claim 4 wherein the DPE circuit is further configured to estimate leakage power, and to provide the respective floor request based on the leakage power and the maximum amount of reduced power consumption.

6. The system as recited in claim 1 wherein a physical interconnect between the power splitter circuit and the respective rate control circuit in a given component circuit of the plurality of component circuits includes a shared bus to transmit the respective power request and the respective floor request, and wherein the respective rate control circuit is configured to select one of the respective power request and the respective floor request to transmit on the shared bus.

7. The system as recited in claim 6 wherein the respective rate control circuit is configured to select the respective floor request based on a change in the respective floor request after a most recent transmission of the respective floor request.

8. The system as recited in claim 6 wherein the respective rate control circuit is configured to select the respective power request based on a change in the respective power request after a most recent transmission of the respective power request.

9. The system as recited in claim 6 wherein the respective rate control circuit is configured to select a least recently transmitted one of the respective floor request and the respective power request based on no change in the respective power request after the most recent transmission the respective power request and no change in the respective floor request after the most recent transmission of the respective floor request.

10. The system as recited in claim 6 wherein the power splitter circuit is configured to use a previously received request as a current request for a non-selected one of the respective power request and the respective floor request.

11. A system comprising:
a plurality of integrated circuits implemented on respective semiconductor substrates, wherein the plurality of integrated circuits are coupled via an inter-chip interconnect, wherein a respective integrated circuit of the plurality of integrated circuits comprises:
a plurality of component circuits, wherein respective component circuits of the plurality of component circuits comprise respective rate control circuits; and
a power splitter circuit coupled to the plurality of component circuits, wherein:
the power splitter circuit is configured to allocate power to the plurality of component circuits based on a power budget for the respective integrated circuit;
the respective rate control circuits are configured to generate respective power requests and respective floor requests, wherein the respective floor requests indicate minimum amounts of power consumable by the corresponding component circuits;
the power splitter circuit is configured to ensure that the plurality of component circuits receive an allocation of power at least equal to a minimum of the respective floor requests and the respective power requests;

the power splitter circuit is configured to allocate remaining power budget based on a power split policy and the respective power requests, wherein the power split policy includes:
a first level policy that specifies a split of the remaining power budget among respective types of component circuits; and
a second level policy that specifies, for an amount allocated to a given type of component circuit, a split of the amount among component circuits of the given type; and
the power splitter circuit is configured to transmit an indication of an unallocated portion of the remaining power budget to the power splitter circuit in another integrated circuit of the plurality of integrated circuits over the inter-chip interconnect.

12. The system as recited in claim 11 wherein the power splitter circuit in the respective integrated circuit is configured to receive a second indication of an unallocated portion of the remaining power budget from the power splitter circuit in another integrated circuit of the plurality of integrated circuits, and wherein the power splitter circuit is configured to include the unallocated portion in a subsequent power allocation.

13. The system as recited in claim 11 further comprising a plurality of voltage regulators, wherein a given voltage regulator of the plurality of voltage regulators is configured to supply power to a subset of the plurality of integrated circuits, and wherein the power splitter circuits in the respective integrated circuits in the subset are configured to transmit the indications of the unallocated portion among the subset.

14. A method comprising:
generating respective power requests and respective floor requests for a power splitter circuit in a system by respective rate control circuits in respective component circuits of a plurality of component circuits in the system, wherein the respective floor requests indicate minimum amounts of power consumable by the corresponding component circuits; and
allocating power to the plurality of component circuits by the power splitter circuit, wherein the allocating comprises:
ensuring that the plurality of component circuits receive an allocation of power at least equal to a minimum of the respective floor requests and the respective power requests; and
allocating remaining power budget based on a power split policy and the respective power requests, wherein the power split policy includes:
a first level policy that specifies a split of the remaining power budget among respective types of component circuits; and
a second level policy that specifies, for an amount allocated to a given type of component circuit, a split of the amount among component circuits of the given type.

15. The method as recited in claim 14 wherein a given component circuit of the plurality of component circuits includes a power control circuit that is configured to caused reduced power consumption in the given component circuit, and wherein the respective floor request for the given component circuit is based on a maximum amount of reduced power consumption that the power control circuit is capable of causing.

16. The method as recited in claim 15 wherein the given component circuit experiences a leakage current in inactive transistors during use, and wherein the respective floor request for the given component circuit is further based on leakage power consumed through the leakage current.

17. The method as recited in claim 14 wherein a physical interconnect between the power splitter circuit and the respective rate control circuit in a given component circuit of the plurality of component circuits includes a shared bus to transmit the respective power request and the respective floor request, and the method further comprises selecting one of the respective power request and the respective floor request to transmit on the shared bus.

18. The method as recited in claim 17 wherein selecting one of the respective power request and the respective floor request to transmit on the shared bus comprises:
- selecting the respective floor request based on a change in the respective floor request after a most recent transmission of the respective floor request;
- selecting the respective power request based on a change in the respective power request after a most recent transmission of the respective power request; and
- selecting a least recently transmitted one of the respective floor request and the respective power request based on no change in the respective power request after the most recent transmission the respective power request and no change in the respective floor request after the most recent transmission of the respective floor request.

* * * * *